United States Patent
Hong et al.

(10) Patent No.: US 11,210,224 B2
(45) Date of Patent: Dec. 28, 2021

(54) FLUSHING ENTRIES IN A CACHE BY FIRST CHECKING AN OVERFLOW INDICATOR TO DETERMINE WHETHER TO CHECK A DIRTY BIT OF EACH CACHE ENTRY

(71) Applicant: Oracle International Corporation, Redwood Shores, CA (US)

(72) Inventors: Sungpack Hong, Palo Alto, CA (US); Hassan Chafi, San Mateo, CA (US); Eric Sedlar, Portola Valley, CA (US)

(73) Assignee: Oracle International Corporation, Redwood Shores (CA)

( * ) Notice: Subject to any disclaimer, the term of this patent is extended or adjusted under 35 U.S.C. 154(b) by 144 days.

(21) Appl. No.: 16/714,111

(22) Filed: Dec. 13, 2019

(65) Prior Publication Data
US 2020/0117604 A1    Apr. 16, 2020

Related U.S. Application Data

(62) Division of application No. 13/791,863, filed on Mar. 8, 2013, now Pat. No. 10,509,725.

(51) Int. Cl.
*G06F 12/0837*    (2016.01)
*G06F 12/0808*    (2016.01)

(52) U.S. Cl.
CPC ...... *G06F 12/0837* (2013.01); *G06F 12/0808* (2013.01); *G06F 2212/50* (2013.01)

(58) Field of Classification Search
CPC ............. G06F 12/0837; G06F 2212/50; G06F 12/12–128; G06F 12/0804
See application file for complete search history.

(56) References Cited

U.S. PATENT DOCUMENTS

| | | |
|---|---|---|
| 5,049,996 A | 9/1991 | Barth |
| 5,768,593 A | 6/1998 | Walters |
| 5,987,594 A | 11/1999 | Panwar et al. |
| 6,122,711 A | 9/2000 | Mackenthun |
| 6,128,771 A | 10/2000 | Tock |
| 6,205,521 B1 | 3/2001 | Schumann |

(Continued)

OTHER PUBLICATIONS

Wikipedia, DRAM Article, https://web.archive.org/web/20120202004024, https://en.wikipedia.org/wiki/Dynamic_random-access_memory, dated Feb. 2, 2012.

(Continued)

*Primary Examiner* — Chie Yew
(74) *Attorney, Agent, or Firm* — Hickman Becker Bingham Ledesma LLP (57) ABSTRACT

Techniques are provided for performing a flush operation in a non-coherent cache. In response to determining to perform a flush operation, a cache unit flushes certain data items. The flush operation may be performed in response to a lapse of a particular amount of time, such as a number of cycles, or an explicit flush instruction that does not indicate any cache entry or data item. The cache unit may store change data that indicates which entry stores a data item that has been modified but not yet been flushed. The change data may be used to identify the entries that need to be flushed. In one technique, a dirty cache entry that is associated with one or more relatively recent changes is not flushed during a flush operation.

20 Claims, 6 Drawing Sheets

(56) References Cited

U.S. PATENT DOCUMENTS

| | | | |
|---|---|---|---|
| 6,658,532 | B1 | 12/2003 | Horrigan |
| 6,668,307 | B1 | 12/2003 | Damron |
| 6,678,794 | B1 | 1/2004 | Talyansky |
| 7,523,264 | B1 | 4/2009 | Danilak |
| 9,460,177 | B1 * | 10/2016 | Pawar ............... G06F 16/1865 |
| 2003/0061450 | A1 | 3/2003 | Mosur et al. |
| 2003/0212865 | A1 | 11/2003 | Hicken et al. |
| 2004/0158681 | A1 | 8/2004 | Hooker |
| 2005/0097288 | A1 | 5/2005 | Holzmann |
| 2005/0172082 | A1 | 8/2005 | Liu et al. |
| 2005/0273561 | A1 | 12/2005 | Siegel et al. |
| 2007/0220200 | A1 | 9/2007 | Gill |
| 2007/0233947 | A1 | 10/2007 | Coulson |
| 2008/0189489 | A1 | 8/2008 | Mitra |
| 2008/0209109 | A1 | 8/2008 | Lasser |
| 2009/0031096 | A1 | 1/2009 | Smith |
| 2009/0144492 | A1 | 6/2009 | Barth |
| 2009/0276578 | A1 | 11/2009 | Moyer |
| 2009/0293047 | A1 | 11/2009 | Chen |
| 2010/0205367 | A1 | 8/2010 | Ehrlich |
| 2010/0235320 | A1 | 9/2010 | Farrell |
| 2010/0235579 | A1 | 9/2010 | Biles et al. |
| 2010/0306448 | A1 | 12/2010 | Chen |
| 2011/0153952 | A1 | 6/2011 | Dixon |
| 2012/0042126 | A1 | 2/2012 | Krick et al. |

OTHER PUBLICATIONS

Techopedia, dated Jul. 3, 2012, https://web.archive.org/web/20120703044201/http://www.techopedia.com/definition/3925/high-level-lanuage-hll., 1 page.

Microsoft Press, dated 2002, "Microsoft Computer Dictionary", Fifth Edition, Redmond, WA, 1 page.

Handy, Jim, dated 1998, "The Cache Memory Book", 2nd Edition: The Authoritative Reference on Cache Design, Academic Press, Inc. Orlando, FL.

Free C/C++ Compilers and Cross-Compilers for Microcontrollers, PDA, Calculators, Embedded Systems and Other Devices, http://www.thefreecountry.com/compilers/cpp-microntrollers-pda.shtml, Jul. 28, 2010, 6pgs.

F. J. Corbat O, "A Paging Experiemnt with the Multics System" In Honor of P. M. Morse, MIT Press, dated May 1968, 12 pages.

Compile, Microsoft Press, dated 2002, Microsoft Computer Dictionary, Fith Edition, Microsoft Press, Richmond, WA, USA, 1 page.

Altera, "Nios II Processor Reference Handbook", dated May 2011, retrieved from the internet http://www.altera.com/support/ip/nios2/niosll_docs_12_0.zip>, 284 pages.

5×86 CPU BIOS Writer's Guide. Manual (online), Cyrix Corporation, dated 1995, http://datasheets.chipdb.org/Cyrix/5×86/5xbiosgd, 18 pages.

Hong, U.S. Appl. No. 13/791,863, filed Mar. 8, 2013, Office Action, dated Dec. 30, 2016.

Hong, U.S. Appl. No. 13/791,863, filed Mar. 8, 2013, Final Office Action, dated Jan. 29, 2018.

Hong, U.S. Appl. No. 13/791,863, filed Mar. 8, 2013, Final Office Action, dated May 19, 2017.

Hong, U.S. Appl. No. 13/791,863, filed Mar. 8, 2013, Interview Summary, dated May 5, 2017.

Hong, U.S. Appl. No. 13/791,863, filed Mar. 8, 2013, Interview Summary, dated Jul. 12, 2017.

Hong, U.S. Appl. No. 13/791,863, filed Mar. 8, 2013, Interview Summary, dated Jul. 14, 2017.

Hong, U.S. Appl. No. 13/791,863, filed Mar. 8, 2013, Notice of Allowance, dated Feb. 21, 2019.

Hong, U.S. Appl. No. 13/791,863, filed Mar. 8, 2013, Office Action, dated Jun. 12, 2018.

Hong, U.S. Appl. No. 13/791,863, filed Mar. 8, 2013, Office Action, dated Sep. 28, 2017.

U.S. Appl. No. 13/791,863, filed Mar. 8, 2013, Office Action, dated Nov. 19, 2015.

Hong, U.S. Appl. No. 13/791,863, filed Mar. 8, 2013, Final Office Action, dated Nov. 19, 2018.

U.S. Appl. No. 13/791,863, filed Mar. 8, 2013, Final Office Action, dated Mar. 24, 2016.

U.S. Appl. No. 13/791,863, filed Mar. 8, 2013, Final Office Action, dated Mar. 17, 2015.

U.S. Appl. No. 13/791,863, filed Mar. 8, 2013, Office Action, dated Nov. 18, 2014.

Hong, U.S. Appl. No. 13/791,863, filed Mar. 8, 2013, Notice of Allowance, dated Aug. 14, 2019.

* cited by examiner

FLUSHING ENTRIES IN A CACHE BY FIRST CHECKING AN OVERFLOW INDICATOR TO DETERMINE WHETHER TO CHECK A DIRTY BIT OF EACH CACHE ENTRY

RELATED APPLICATION

This application claims the benefit as a Divisional of application Ser. No. 13/791,863, filed Mar. 8, 2013, the entire contents of which is hereby incorporated by reference as if fully set forth herein, under 35 U.S.C. § 120. The Applicant hereby rescinds any disclaimer of claim scope in the parent application or the prosecution history thereof and advise the USPTO that the claims in this application may be broader than any claim in the parent application; which is related to U.S. patent application Ser. No. 13/791,847, filed Mar. 8, 2013, the contents of which are incorporated by reference, as if fully set forth herein.

TECHNICAL FIELD

Embodiments relate to non-coherent cache systems and, more particularly to, flushing cache entries.

BACKGROUND

Almost all computer systems use caches. A cache is a hardware component that stores data so that future requests for that data can be served faster. A CPU cache is a cache used by the central processing unit of a computer to reduce the average time to access memory. Relative to main memory, a cache is a smaller, faster memory that stores copies of data from the most frequently used main memory locations. As long as most memory accesses are cached memory locations, the average latency of memory accesses will be closer to the cache latency than to the latency of main memory.

Typically, data is transferred between memory and cache in blocks of fixed size, referred to as cache lines. When a cache line is copied from memory into a cache, a cache entry is created. The cache entry includes the copied data and the requested memory location (sometimes referred to as a "tag"). When a processor needs to read or write a location in main memory, the processor first checks for a corresponding entry in the cache. The cache checks for the contents of the requested memory location in any cache lines that might contain that address. If the processor finds that the memory location is in the cache, a cache hit has occurred; otherwise, a cache miss occurs. In other words, a "cache miss" refers to a failed attempt to read or write a piece of data in the cache, which results in a main memory access that is associated with much longer latency. In the case of a cache hit, the processor immediately reads or writes the data in the cache line. In the case of a cache miss, the cache may allocate a new entry and copy in data from main memory. Then, the request is fulfilled from the contents of the cache.

Shared memory multiprocessor systems are increasingly common. Each processor (or core) typically includes its own cache to store frequently accessed data items. Each processor has access to and operates on the same (shared) data. An issue that must be addressed in shared memory multiprocessor systems is coherency. Cache coherence is the discipline that ensures that changes in the values of shared data items are propagated throughout the system in a timely fashion. Cache coherency may be implemented in hardware, software, or a combination of hardware and software. Reference herein to a "coherent cache system" (or simply "coherent cache") is one that implements cache coherency primarily through a hardware-oriented approach. Reference herein to a "non-coherent cache system" (or simply "non-coherent cache") is one where software implements coherency among the caches of the system.

Numerous schemes have been proposed both in academia and in industry about how to implement scalable coherent caches. However, large-scale coherent caches are complicated, expensive, and power intensive. Also, it is not clear if coherent caches are scalable as the hardware must ensure the coherence between data items on multiple cache locations at any moment.

In contrast, non-coherent caches do not provide any hardware support for coherence and store potentially stale data. In non-coherent caches, software is required to ensure that stale data is not incorrectly accessed. Although this approach greatly simplifies cache design complexity and power consumption of the cache hardware, this approach adds certain performance overheads to the software side.

For an instance, a typical critical section of a parallel software implementation generically appears as follows:

```
BEGIN_CRITICAL_SECTION( )
    some_loop {
        random_read_of_shared_data
        do_local_computation( )
        random_write_of_shared_data( )
    }
END_CRITICAL_SECTION( )
```

When such a parallel software implementation is ported to a system with non-coherent caches, some cache operations are added in order to ensure the correctness of the program. Specifically, the software should "invalidate" a cache at the beginning of each critical section. "Cache invalidation" is the process of deleting cache entries. Cache invalidation is performed because a particular cache might be holding (or storing) "stale" data items, or data items that have been updated in other cores but have not yet been updated in the particular cache. Similarly, at the end of each critical section, the software should flush all the "dirty" entries (or entries that contain data that has been modified but not yet reflected in shared memory) in a cache to make sure that the modified data is visible to other cores.

However, the cache operations of invalidating and flushing add significant performance overhead to software execution for at least the following two reasons. First, data access after cache invalidation induces cache misses. There are three kinds of cache misses: instruction read miss, data read miss, and data write miss. Cache misses may be introduced for heavily used data stored on a stack. Second, a cache flush requires a significant amount of time because every cache entry has to be examined and to be flushed if it holds dirty data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for increasing efficiency in non-coherent cache systems. One technique involves an invalidation operation that, when performed, only affects a strict subset of the entries in a cache. For example, only cache entries that store data items that are associated with memory addresses that fall within a particular set (or range) of memory addresses are invalidated or cleared.

Another technique involves a flush operation that, when performed, only considers a strict subset of the entries in a cache. For example, "dirty" cache entries are tracked and, when a flush operation is performed, only those dirty cache entries are considered for flushing without examining data associated with all cache entries. Additionally or alternatively, a flush operation is performed automatically based on, for example, a timer and not based on any instruction. Additionally or alternatively, the flush operation may be initiated by a flush instruction that does not indicate any cache entry. Additionally or alternatively, a cache entry that is "dirty" is not flushed during a flush operation if the cache entry has been updated one or more times since the last flush operation.

Although embodiments herein are described in the context of multi-core systems, the flush operation described herein may be performed in a single core system where cache coherency is not an issue.

Specialized Circuitry

Caches are described herein as including "logic" or specialized circuitry. The term "specialized circuitry" refers to digital circuits that perform a set of functions and that are either hardwired to perform the set of functions or persistently programmed to perform the set of functions. Persistently programmed digital circuits include digital electronic application-specific integrated circuits (ASICs) or field programmable gate arrays (FPGAs). Specialized circuitry does not include a general purpose processor that is configured to perform functions by executing a software instruction set or program that can reside in memory.

In contrast, the term "software" refers to an instruction set or program executed by digital circuits that perform an expansive set of functions on a general purpose processor. Software is neither hardwired nor persistently programmed to perform specific functions. While software can be used to implement expansive functionality, software typically performs slower and requires more overhead than functions performed by specialized circuitry. For convenience of expression, when software is described as performing an act, instructions are being executed on a general purpose processor to perform the act.

Example Cache System

Figure 1:
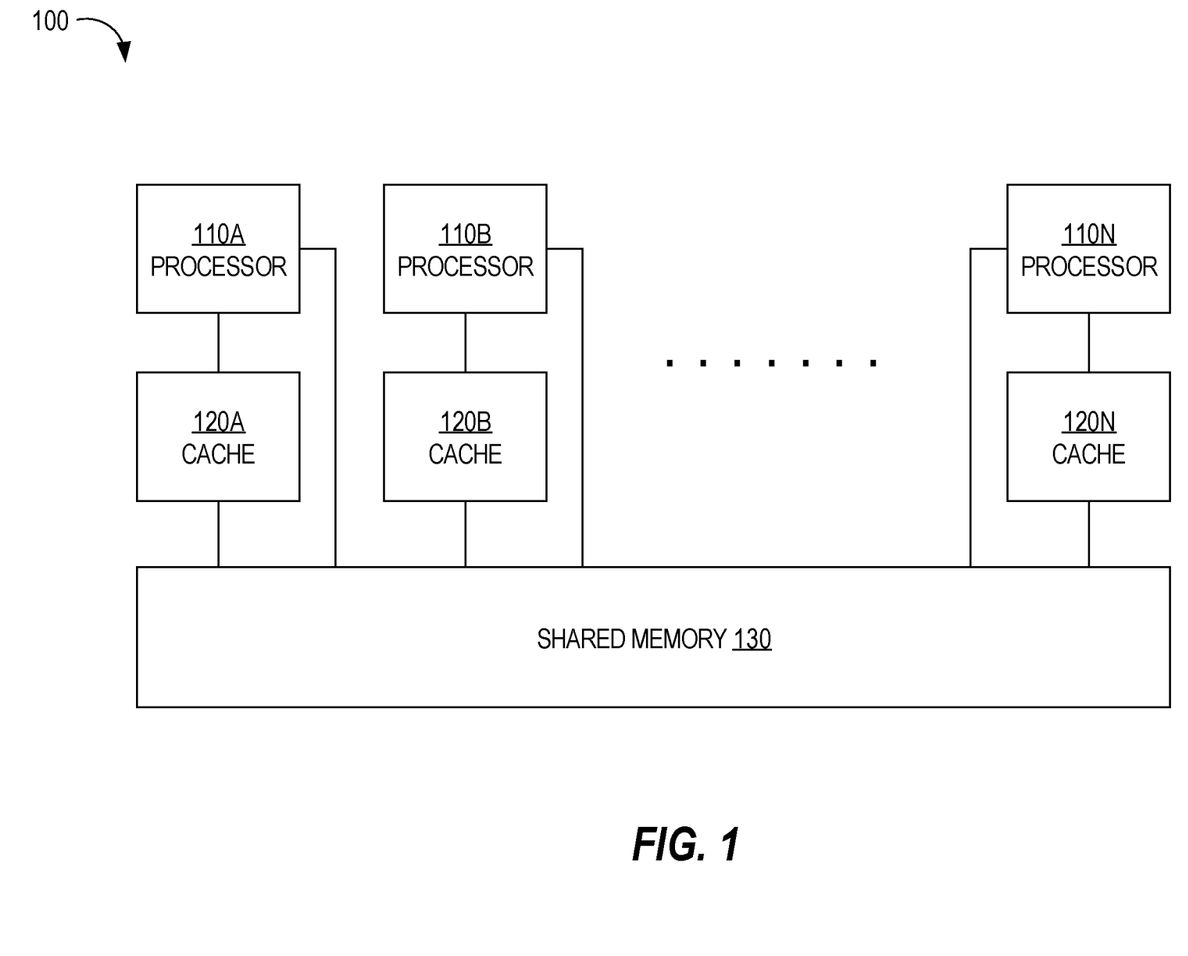
FIG. 1 is a block diagram that depicts a multiprocessor system, in an embodiment.

FIG. 1 is a block diagram that depicts a multiprocessor system 100, in an embodiment. Multiprocessor system 100 includes multiple processors 110A-N, multiple caches 120A-N, and shared memory 130. Although three processors and caches are depicted, multiprocessor system 100 may comprise less or more than three.

Each processor 110 and each cache 120 is coupled to shared memory 130. Shared memory 130 may be volatile memory (e.g., RAM), non-volatile memory (e.g., ROM, flash memory, hard disk), or a combination of volatile and non-volatile memory. Each of processors 110A-N determines whether a requested data item is found in its corresponding cache. If not, then each of processors 110A-N is configured to send, to shared memory 130, a request for that data item.

Cache 120 includes a plurality of cache entries, each of which stores a data item and, optionally, one or more values associated with the date item. For example, each cache entry may store a memory address where the corresponding data item is located in shared memory 130. Cache 120 also includes special-purpose hardware logic for performing one or more operations with respect to the plurality of cache entries, such as an invalidation operation and/or a flush operation.

Cache 120 may comprise one or more hardware components. If cache 120 comprises a single hardware component, then the single hardware component includes the plurality of entries and the hardware logic. If cache 120 comprises multiple hardware components, then one component may include the plurality of cache entries and another hardware component may include the hardware logic. Regardless of whether cache 120 comprises a single hardware component or multiple hardware components, cache 120 may be considered a "cache unit."

Gang Invalidation

According to an embodiment, a cache supports an invalidation operation that, when performed by the cache, only affects a strict subset of entries in the cache rather than all the entries in the cache. Such invalidation is referred to herein as "gang invalidation."

Figure 2:
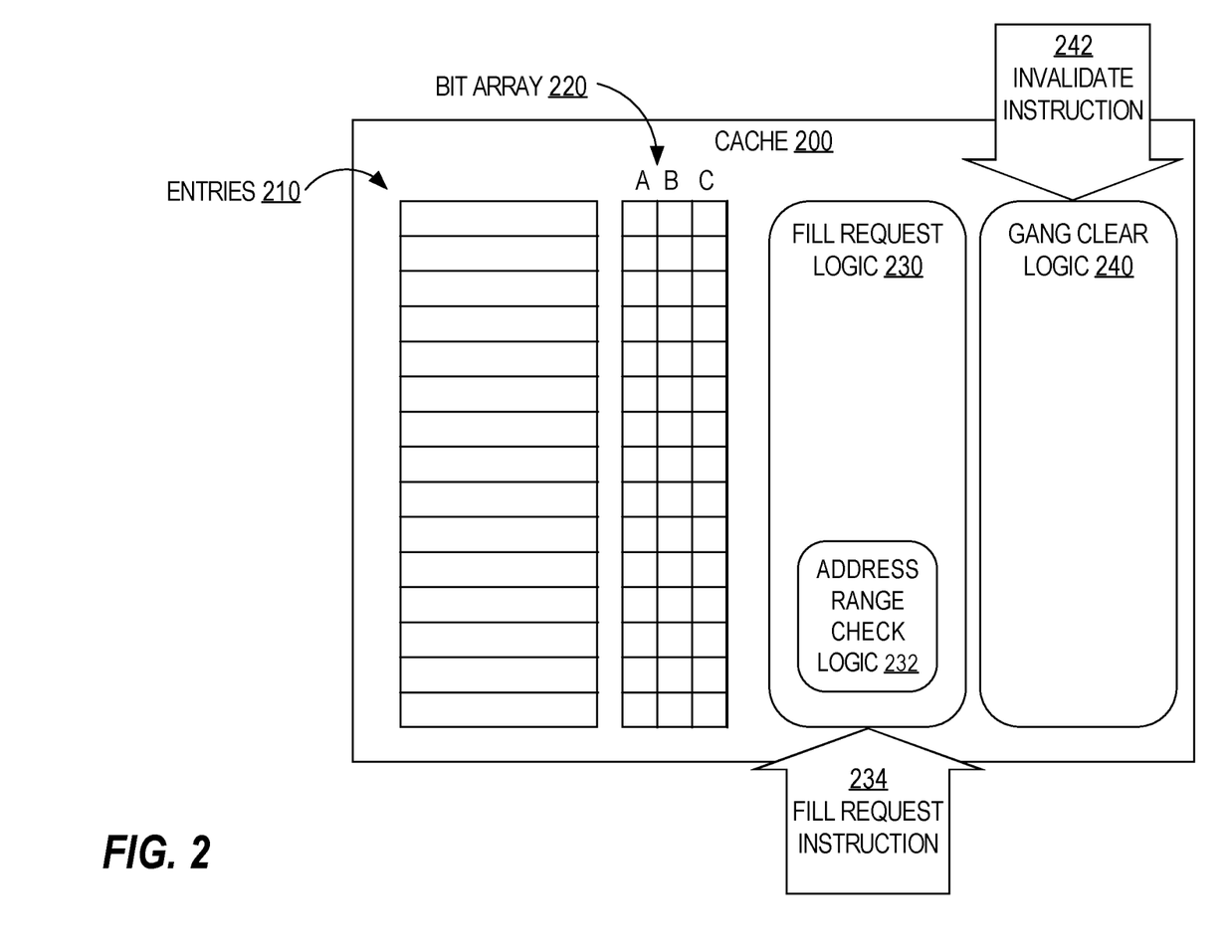
FIG. 2 is a block diagram that depicts an example cache that supports gang invalidation, in an embodiment.

FIG. 2 is a block diagram that depicts an example cache 200 that supports gang invalidation, in an embodiment. Cache 200 may correspond to one of caches 120A-N depicted in multiprocessor system 100. Cache 200 includes multiple entries 210, a bit array 220, fill request logic 230, and gang clear logic 240.

Each of entries 210 stores a data item, such as a 64-bit value. A data item may be of any data type format, such as an integer, a character string, a date, a double, or a float. The size of each entry in entries 210 may be the same or may vary from entry to entry. Each of entries 210 may also store (or otherwise be associated with) a memory address that indicates a location in memory where the corresponding data item is stored.

Each of one or more entries in entries 210 are associated with invalidation data that indicates whether the entry is to be invalidated (or cleared) during the next invalidation operation. In an embodiment, the invalidation data comprises a single bit.

In the depicted example, cache 200 includes bit array 220, which includes three bits for each entry in entries 210. The three bits are labeled 'A', 'B', and 'C'. In another embodiment, bit array 220 includes more or less than three bits for each entry in entries 210.

Invalidation Data

Bit 'A' corresponds to invalidation data. When set (e.g., to '1'), bit 'A' indicates that the data item in the corresponding entry is to be invalidated during the next invalidation operation. In an embodiment, a set A bit indicates that the corresponding data item is associated with a memory address that is indicated in a particular set of memory addresses. The memory addresses in the particular set may be addresses of memory locations within shared memory 130. In other words, the particular set of memory addresses may only be relevant to shared memory 130. Alternatively, in a single processor system, the particular set of memory addresses may be addresses of memory locations within non-volatile storage or other volatile storage.

The particular set of memory addresses may be indicated by a single range of memory addresses, by multiple ranges of memory addresses, by non-contiguous memory addresses, or any combination thereof. The particular set of memory addresses is stored within fill request logic 230.

The particular set of memory addresses may have been indicated by a programmer in a high-level programming language, such as a Java programming language or a C programming language. (A programmer is generally not aware of which memory addresses will be associated with data items that are created by a program when the program is compiled and executing. However, the program will likely specify a name for each data item, such as "array[i]." At runtime, a memory address will be assigned to each data item.) Alternatively, the particular set of memory addresses may have been determined by a compiler that analyzes and compiles a high-level programming language. Based on the analysis, the compiler may identify future data accesses that would require an invalidation of a cache, or a portion thereof. The compiler compiles application code (composed by a programmer) to generate assembly code that specifies the particular set of memory addresses.

A cache entry that stores a data item that is associated with an address that is in the particular set of memory addresses is referred to herein as a "target cache entry." Thus, in an embodiment, a target cache entry is one whose A bit is set (e.g., to '1').

Dirty Data and Hot Data

Bit 'B', when set, indicates that the corresponding cache entry is "dirty." In other words, a data item that is stored in a "dirty" entry reflects an update but a shared version of the data item in memory (e.g., shared memory 130) does not yet reflect that change. Thus, other caches in multiprocessor system 100 may store an old or "stale" version of the data item.

Bit 'C', when set, indicates whether the data item in the corresponding entry has been updated since performance of the last flush operation. If bit 'C' is set, then the data item in the corresponding entry is considered "hot" or "active." This bit is described in more detail below.

Non-Single Bit Values

Although cache 200 is depicted as including bit array 220, the data indicated by each bit in bit array 220 may be indicated by other "non-single bit" values, such as a single byte. For example, each entry in entries 210 is associated with "dirty data" that indicates whether the data item in the corresponding entry has been updated and not yet flushed to shared memory 130, where the "dirty data" is a single byte. As another example, each entry in entries 210 is associated with "hot data" that indicates a number of times the data item in the corresponding entry has been updated since performance of the most recent flush operation, where the "hot data" is three bits.

Filling a Cache

Cache 200 also includes fill request logic 230, which includes logic for receiving and processing fill request instructions, such as fill request instruction 234. A fill request instruction includes one or more data items that are to be stored in an entry of entries 210.

In response to receiving a fill request instruction, fill request logic 230 selects an "empty", unused, or otherwise available entry from entries 210. Selection of an available entry may be performed in one of multiple ways. An available entry may be one that indicates all 0s. In this way, fill request logic 230 scans entries 210 for an entry that has all 0s. Additionally or alternatively, an entry may be associated with availability data that indicates that it is available for storing a new data item. Availability data may be implemented as a bit, which may be part of bit array 220.

If there is no available entry in entries 210, then fill request logic 230 may select a non-empty entry in entries 210 and invalidate that entry. Fill request logic 230 may include logic for intelligently selecting the non-empty entry, such as an entry that has least recently used (LRU) relative to other entries in entries 210.

In addition to one or more data items, a fill request instruction, such as fill request instruction 234, may also include one or more memory addresses associated with the one or more data items. Each memory address is used by address range check logic 232 to determine whether the memory address is within a particular set of memory addresses. If so, then fill request logic 230 sets (e.g., to '1') bit 'A' that corresponds to the entry that holds the corresponding data item. If not, then bit 'A' that corresponds to the entry that holds the data item remains "unset" (e.g., 0).

In an embodiment, fill request logic 230 maintains a base address, a size (that indicates the range in combination with the base address), and less than and/or greater than comparators. Such data and comparators may be implemented within address range check logic 232. For each address indicated in a fill request instruction, fill request logic 230 tests if the address falls within the range indicated by the base address and the size by using the comparators. For example, the base address is B, the size is S, and a fill request instruction includes an address A. S may be a number of elements multiplied by the size of each element. Fill request logic 230 (or address range check logic 232) may perform the following comparisons: $B<=A$ and $A<=B+S$.

The base address and size may have been specified with a memory specification instruction received from a processor (e.g., processor 110A) that is coupled to cache 200. The memory specification instruction may have been initiated based on application code that was composed by a software developer and that is executing (or rather a compiled version of the application code is executing) on the processor.

Gang Clear Logic

As depicted in FIG. 2, cache 200 also includes gang clear logic 240. Although depicted as being implemented on the same hardware component, gang clear logic 240 may be implemented on a separate hardware component from entries 210. In other words, cache 200 may comprise multiple hardware components. Regardless of how cache 200 and gang clear logic 240 are implemented, together cache 200 and gang clear logic 240 are considered a single "cache unit."

Gang clear logic 240 includes special-purpose hardware logic for clearing (or invalidating) one or more of entries 210. Gang clear logic 240 receives and processes invalidate instructions, such as invalidate instruction 242, and performs invalidation operations in response thereto. Invalidate instruction 242 originates from a processor (e.g., processor 110A) that is associated with cache 200. Invalidate instruction 242 may have been specified by a programmer in a high level language, such as the Java programming or the C programming language. The programmer may have an idea of which data items should be invalidated before a cache is "refilled" with new data items. In this way, a programmer is given control over when invalidation is performed.

In an embodiment, invalidate instruction 242 does not indicate any data item or any memory address of a data item in entries 210. In this way, a software programmer does not have to specify individual invalidate instructions for each cache entry that needs to be invalidated. Instead, a single invalidate instruction results in multiple cache entries being invalidated.

In response to receiving an invalidate instruction, gang clear logic 240 clears target cache entries in entries 210. In an embodiment, target cache entries are entries that are associated with an 'A' bit that is set. As noted previously, when a data item is added to cache 200, address range check logic 232 determines whether an address of the data item is indicated in a particular set of memory addresses. If so, then the 'A' bit that corresponds to the cache entry that holds the data item is set. As a result, the cache entry becomes a target cache entry. Later, during an invalidation operation, every target cache entry is cleared or invalidated.

An invalidation operation may be performed in a single instruction cycle that involves multiple steps: a fetch step where the invalidate instruction is received, a decode step where an opcode is moved to a register, and an execute step where each target cache entry in cache 200 is cleared or invalidated. Because each cache entry is associated with a bit A, gang clear logic 240 may implement an AND operation that, when performed, clears all target cache entries, i.e., that have a bit A that is set.

Invalidating a cache entry involves removing the corresponding data item (e.g., zeroing out the bits) and/or setting a "cleared" bit associated with cache entry. Later, fill request logic 230 may use the "cleared" bit to identify a cache entry that is available to store another data item. Invalidating a cache entry may also involve resetting (in bit array 220) any set bits that correspond to the cache entry. For example, all bits in bit array 220 that correspond to an invalidated cache entry may be set to 0.

Example Invalidation Process

Figure 3:
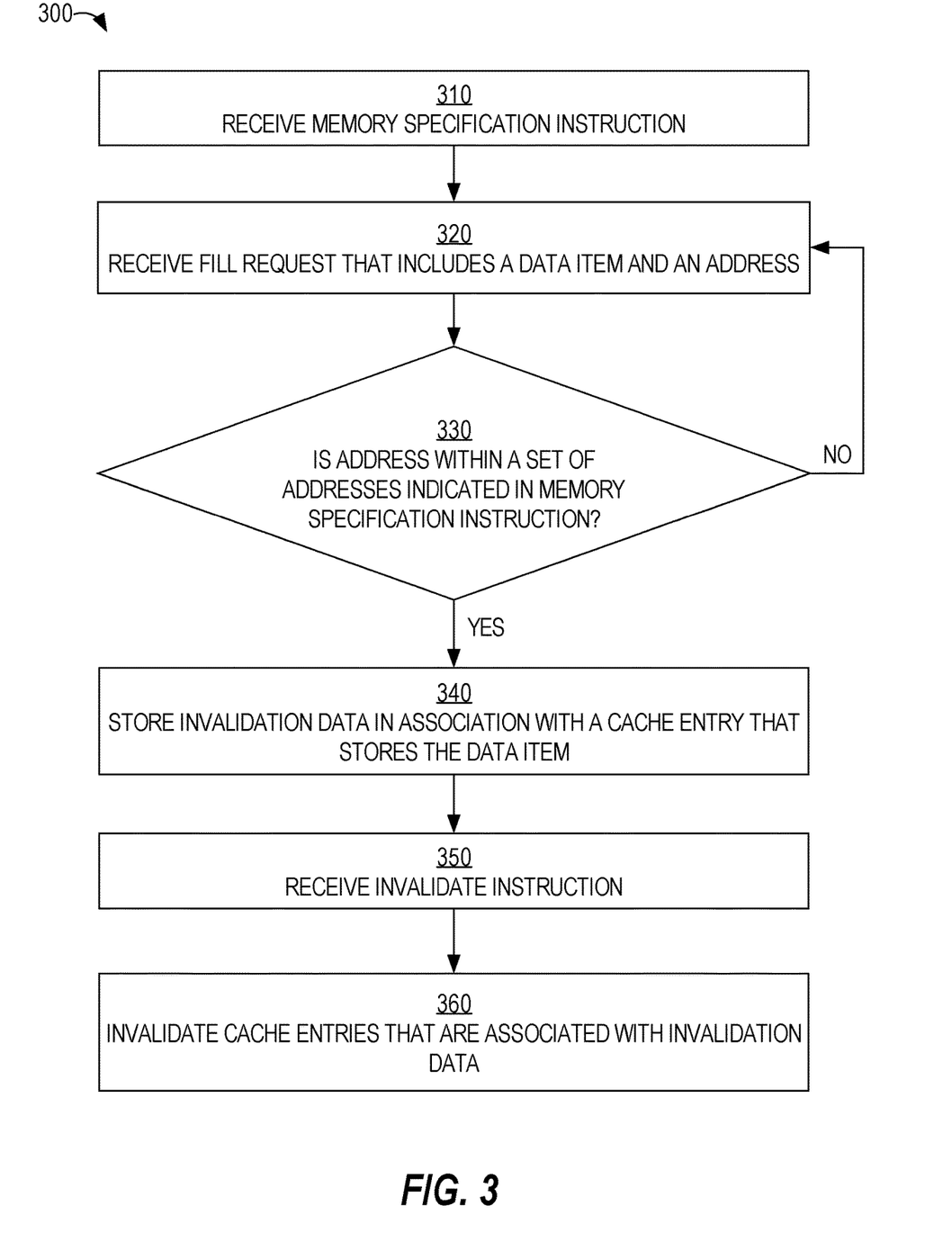
FIG. 3 is a flow diagram that depicts a process for invalidating cache entries in a cache, in an embodiment.

FIG. 3 is a flow diagram that depicts a process 300 for invalidating cache entries in a cache, such as cache 200, in an embodiment. Process 300 is performed by a cache manager of the cache. The cache manager includes logic (e.g., gang clear logic 240) for processing cache operations that are directed to entries within the cache. The cache manager may be an integral part of the cache or may execute separately from the cache.

At block 310, a memory specification instruction is received. The memory specification instruction indicates a set of one or more of memory addresses. The memory specification instruction may originate from a processor that is connected to the cache and that executes instructions that include the memory specification instruction. The set of one or more memory addresses is stored in the cache for later use when a fill request instruction is received.

At block 320, a fill request instruction is received. The fill request instruction includes a data item and a memory address. The fill request instruction may be received in response to a cache miss, or determining that the cache does not include the data item.

At block 330, it is determined whether the memory address of the data item is in the set of one or more memory addresses. If so, then process 300 proceeds to block 340. If not, the process 300 proceeds to block 320.

At block 340, invalidation data is stored in association with a cache entry that stores the data item. The invalidation data indicates that the cache entry may be cleared or invalidated when an invalidation operation is performed. The invalidation data may be a particular bit value that is associated with the cache entry.

Depending on the next instruction, process 300 may proceed to block 320 or block 350. Thus, blocks 320-340 may be performed a number of times before process 300 proceeds to block 350.

At block 350, an invalidate instruction is received. The cache manager may determine that an invalidation instruction is received by checking one or more bits at a storage location that is accessible to the cache manager, such as in the cache.

At block 360, cache entries that are associated with invalidation data are cleared or invalidated and any associated data (e.g., dirty bits that are set or hot bits that are set) is reset.

A benefit of the selective invalidation approach described herein is that many cache entries are not unnecessarily invalidated. Such cache entries may contain data items that should not be cleared in many cases. Examples of such data items include contents of a local program stack or constants whose values are initialized at the beginning of a program but are not further changed. Another benefit of the selective invalidation approach described herein is that invalidation may be performed in just a few cycles, whereas a prior invalidation approach involved multiple invalidate instructions, where each invalidate instruction targets a different cache entry and requires one or more cycles.

Flushing

One approach to flushing cache entries is referred to as a "write-through" approach where a write to memory is done synchronously with a write to a cache. The "write-through" approach is implemented in hardware. A flush operation is not required at all. However, this approach is inefficient in that a lot of "traffic" or write instructions are performed continuously.

Another approach to flushing cache entries is referred to as a "write-back" approach where, initially, a write to a cache is performed, but the write to memory (i.e., a flush) is postponed until the dirty cache entry are about to be modified or replaced by new content, such as during an invalidation operation. However, this approach is inefficient because many write-back situations involve flushing a significant number of cache entries in a short window of time in response to invalidate instructions that affects those cache entries. Also, this approach requires a programmer to specify a flush instruction for each dirty cache entry. For example, if a software program involves modifying a thousand elements in an array, then the software program must specify a flush instruction for each of the thousand elements.

Automatic Flush

According to an embodiment, a flush operation is performed on one or more "dirty" cache entries automatically without implementing a write-through approach or a write-back approach. Instead, one or more dirty cache entries are flushed periodically, such as the lapse of a particular period of time, such as every K cycles, K being a positive integer. If K is 1, then the cache effectively becomes a write-through cache. If K is too large, then the cache effectively becomes a write-back cache. Thus, a K that is neither too large nor too small allows an efficient use of computer resources when performing flush operations.

Adjusting the value of K is akin to turning a knob to adjust how "write-through" or how "write-back" the cache is going to be. Thus, in an embodiment, a cache may be flushed at a first point in time based on a first value for K and later flushed at a second point in time based on a second value for K that is different than the first value.

"Smart" Flush

According to an embodiment, a flush operation implemented by a cache unit involves flushing one or more dirty cache entries without analyzing or considering any non-dirty cache entries (or, at least, all entries) in the cache unit. Such a flush operation is referred to herein as a "smart flush." A smart flush may be part of an automatic flush, described previously. Flushing a cache entry involves writing contents of the cache entry to other memory, such as volatile memory (e.g., RAM) or non-volatile memory, such as a hard disk or flash memory. The "other memory" may be shared memory that is accessible to other caches in a multiprocessor system, such as shared memory 130 in system 100 of FIG. 1.

Before a smart flush is performed, change data is created in response to updates to data items in a cache. Change data indicates which cache entries of a plurality of cache entries (in a cache) store data items that have been updated but not yet flushed. In other words, change data identifies "dirty" cache entries. Change data includes entry locators or values that indicate where each dirty cache entry is located among the plurality of cache entries. For example, if a cache entry is at location 38 in a cache, then an entry locator for that cache entry is '38.'

Figure 4:
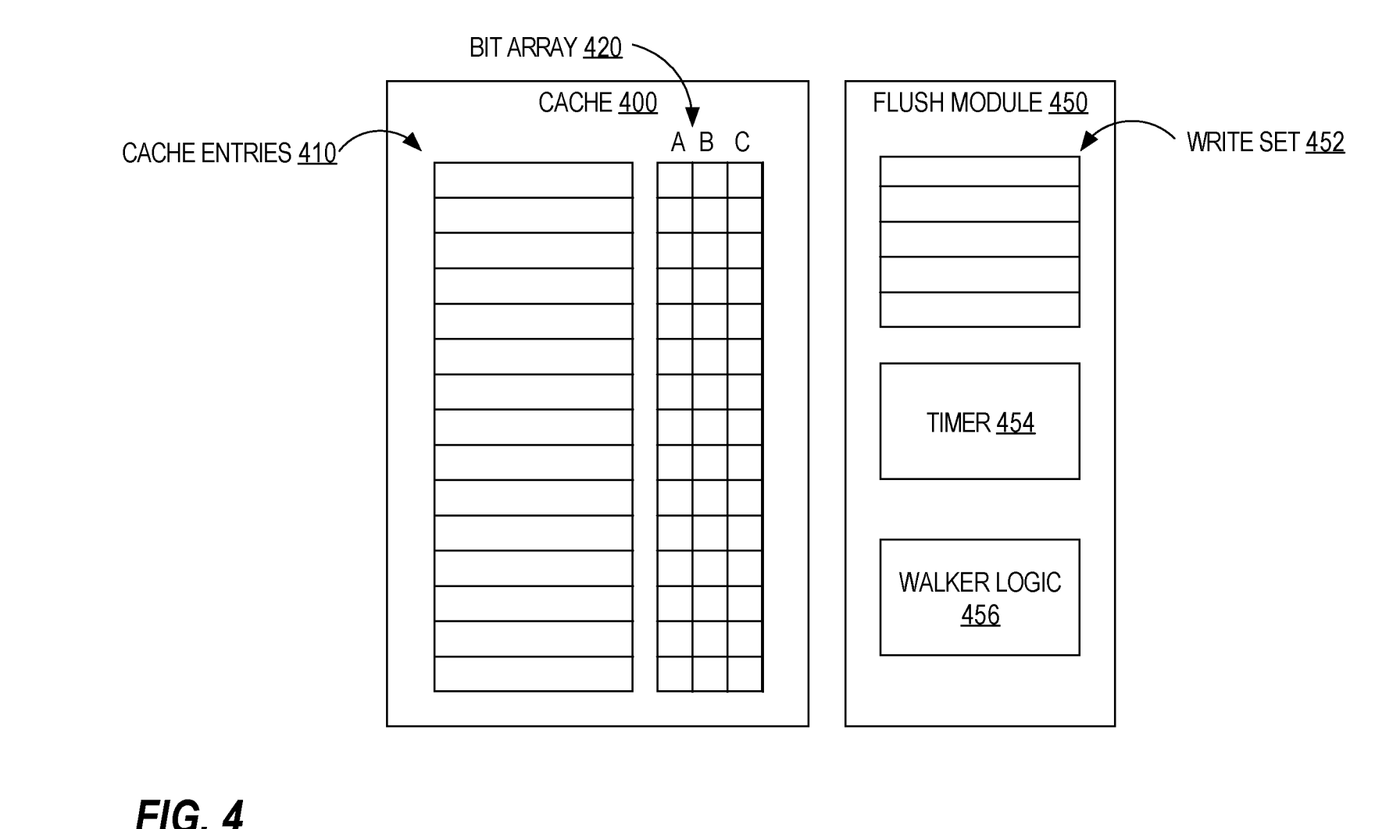
FIG. 4 is a block diagram that depicts a cache that supports an automatic flush and a "smart" flush, in an embodiment.

FIG. 4 is a block diagram that depicts a cache 400 that supports an automatic flush and a smart flush, in an embodiment. However, in an alternative embodiment, cache 400 implements only one of the two types of flushes.

Cache 400 is connected to a flush module 450 that is configured to flush one or more entries from cache 400. Although depicted as separate from cache 400, flush module 450 may be integrated within cache 400, similar to gang clear logic 240. In other words, cache 400 and flush module 450 may be implemented on a single hardware component. Because cache 400 and flush module 450 are implemented in hardware, together cache 400 and flush module 450 are considered a single "cache unit."

Similar to cache 200, cache 400 includes entries 410 and bit array 420. Bit array 420 may contain the same type of information as bit array 220. Alternatively, bit array 420 may be smaller than bit array 220. For example, bit array 420 may only contain bit B (the "dirty" bit) and/or bit C (the "hot" bit).

Although not depicted, in addition to automatic flush and smart flush, cache 400 may also support gang invalidation, similar to cache 200. Therefore, cache 400 may include fill request logic and gang clear logic.

Flush module 450 includes a write set 452, a timer 454, and walker logic 456. Flush module 450 is configured to keep track of which of entries 410 store data items that have been updated but not yet "flushed" (e.g., to shared memory 130 or to other memory not depicted). Such entries are to herein as "dirty entries." For each data item that is updated, flush module 450 records, in write set 452, where the corresponding cache entry is located. A value that indicates a location of a cache entry among entries 410 is referred to herein as an entry locator. The entry locator value uniquely identifies a particular cache entry among the plurality of cache entries in cache 400. For example, if there are 100 cache entries in entries 410, an entry locator for the first cache entry may be '0' while an entry locator for the last cache entry may be '99'. Thus, an entry locator acts an index value into entries 410. If a data item in a cache entry at position 31 is modified, then flush module 450 records '31' in write set 452.

Flush Triggers

After recording one or more entry locators in write set 452, flush module 450 determines to perform a flush operation. A flush operation involves determining which cache entries are "dirty." A flush operation may be triggered or initiated in one of multiple ways.

One possible flush trigger involves flush module 450 receiving an explicit flush instruction from a processor (e.g., a general purpose microprocessor) that is connected to cache 400 (although not depicted in FIG. 4). This is referred to herein as a "software flush trigger." For example, the processor executes a software program that includes instructions for accessing database objects, such as relational tables or structured (e.g., XML) documents, and performing one or more operations on data within the database objects. The software program also includes instructions for initiating a flush operation.

One benefit of flushing approaches described herein is that, in the context of software flush triggers, a software program only needs to specify a single flush instruction and only a single flush instruction is sent by a processor (e.g., processor 110A) to a cache unit (e.g., cache 120A). In this way, a software program is not required to specify a flush instruction for each dirty cache entry.

Another possible flush trigger is the "size" of write set 452. This is referred to herein as a "size flush trigger." For example, if write set 452 contains ten entry locators, then flush module 450 determines to perform a flush operation.

Another possible flush trigger is a lapse of a particular period of time. This is referred to herein as a "time flush trigger." For example, timer 454 counts down (or up) based on the number of instruction cycles detected or based on a current time. If, for example, timer 454 reaches 0 (or 1000 from 0), then flush module 450 determines to perform a flush operation.

Timer 454 generates an enable signal at every K cycles, where K is configurable. Timer 454 may be configured in one of multiple ways. For example, timer 454 may be configured based on a CPU instruction for configuring CPU registers and caches.

Timer 454 may reset after any flush operation is performed, regardless of which flush trigger causes performance of the flush operation. Alternatively, timer 454 may only reset after a flush operation is performed in response to a time flush trigger. For example, flush module 450 performs a first flush operation at time T1 in response to a software flush trigger, but flush module 450 does not reset timer 454. Later, at time T2, flush module 450 performs a second flush operation in response to a time flush trigger. Flush module 450 also resets timer 454 in response to determining to perform the second flush operation.

In an embodiment, flush module 450 only supports a single flush trigger, such as a time flush trigger. In an alternative embodiment, as indicated previously, flush module supports multiple flush triggers. For example, flush module 450 performs a flush operation in response to a size flush trigger and later performs a flush operation in response to a time flush trigger.

Flushing

As noted previously, flush module 450 includes walker logic 456. Walker logic 456 may comprise a register and increment logic. Walker logic 456 is triggered based on a flush trigger, such as a time flush trigger. Walker logic 456 "walks" through write set 452 to identify one or more entry locators indicated in write set 452. If write set 452 is empty, then none of cache entries 410 is considered. Thus, a flush operation may not require any more time than it takes to determine that write set 452 is empty.

Otherwise, for each entry locator indicated in write set 452, walker logic 456 uses the entry locator to identify a particular cache entry from among entries 410, without analyzing any bits of any other entry in entries 410. Walker logic 456 may also examine dirty data that indicates whether the particular cache entry is dirty to verify that the particular cache entry is dirty before flushing the particular cache entry. As indicated previously, the dirty data may be implemented with a dedicated "dirty" bit (e.g., bit B in bit array 420) that is associated with the particular cache entry. If dirty data is maintained separate from write set 452, then walker logic 456 also "resets" the dirty data (e.g., the dirty bit) associated with the particular cache entry as part of the flush operation.

In prior approaches, a flush operation involved examining the "dirty" bit of each cache entry to determine whether the dirty bit was set. If so, then the cache entry was flushed. Thus, in prior approaches, dirty bits of some "non-dirty" cache entries were examined. In contrast, according to embodiments described herein, dirty bits of non-dirty entries are not required to be examined.

In an embodiment, if write set 452 "overflows," then walker logic 456 (or other logic not depicted in FIG. 4) examines a dirty entry data (e.g., a "dirty bit") associated with each entry in cache entries 410. In other words, each entry in cache entries 410 is considered during a flush operation. Write set 452 "overflows" if an attempt to write an entry locator to write set 452 failed because each entry in write set 452 already contains an entry locator. In response to determining whether to perform a flush operation, flush module 450 may first analyze overflow data that indicates whether write set 452 has "overflowed." The overflow data may be implemented as single bit.

In an embodiment, flush module 450 does not include write set 452. Thus, for each flush operation, dirty entry data is analyzed for each entry in cache entries 410 to determine whether to flush the corresponding cache entry. In other words, smart flush may not be implemented for cache 400. Instead, cache 400 may implement automatic flush and/or one of the other flush techniques described herein.

Address Range Flush

In an embodiment, a flush operation is only performed for dirty target cache entries, i.e., dirty cache entries that have data items that are associated with addresses that are in a particular set of memory addresses. This type of flush is referred to herein as an "address range flush." Thus, a flush operation may be performed similarly to gang invalidation described previously where only target cache entries are involved in the operation.

For example, during a flush operation, walker logic 456, after determining an entry locator indicated in write set 452, identifies a cache entry in entries 410 based on the entry locator and also checks address range data that is associated with a particular set of memory addresses, which may involve one or more different memory addresses ranges. Address range data may be implemented using a bit in bit array 420, such as bit 'A' described previously. If the data item in the identified cache entry is associated with an address that is within a particular set of addresses (as indicated by the address range data), then the cache entry is flushed (or not flushed, depending on the implementation).

In an embodiment, a cache unit (e.g., cache 400) implements address range flush and zero or more other flush techniques described herein, such as automatic flush and smart flush. Thus, a cache unit may implement address range flush but none of the other flush techniques described herein.

"Hot" Cache Entries

In an embodiment, during a flush operation, one or more cache entries are not flushed even though the cache entries are "dirty." One reason why a dirty cache entry is not flushed is because the cache entry stores a data item that does not need to be flushed until a later time. For example, no other processor may need to read the corresponding data item until that later time. As another example, a software program executed by a processor that is connected to the cache may require the corresponding data item in order to perform multiple updates to the data item, where none of the intermediate versions of the data item will be used by other programs. Thus, any flushes of the dirty cache entry before that later time may be considered unnecessary and wasteful, since the computer resources that are required to flush a dirty cache entry is not trivial.

In an embodiment, cache 400 or flush module 450 includes "hot" entry data that indicates whether a cache entry is "hot" or heavily used.

In an embodiment, hot entry data is reflected using a dedicated bit in bit array 420, such as bit C, described previously. If bit C of a cache entry is set (e.g., to '1') when a flush operation is being performed, then the corresponding cache entry is not flushed. Instead, walker logic 456 resets the C bit (e.g., to 0). Next time, if the C bit is not set, then the corresponding dirty cache entry is flushed.

In an embodiment, even if a dirty cache entry is considered "hot," the dirty cache entry is flushed in some instances.

For example, some flush operations may be considered "hard" flush operations and other flush operations may be considered "soft" flush operations. A soft flush operation considers hot entry data (e.g., bit C) associated with a dirty cache entry when determining whether to flush the dirty cache entry. Conversely, a hard flush operation does not take into account hot entry data when determining whether to flush a dirty cache entry. Thus, in a hard flush scenario, a "hot" dirty cache entry is flushed. For example, a hard flush operation may be one that is based on a flush instruction that indicates one or more individual cache entries and the one or more individual cache entries, if dirty, are flushed regardless of what hot entry data associated with the one or more cache entries indicate. As another example, a soft flush operation may be one that is initiated based on a timer flush trigger.

In an embodiment, the flush operation may be initiated by a flush instruction that specifies or indicates a particular cache entry. For example, the flush instruction may include an address that is associated with data item that is included in the particular cache entry. Thus, a flush operation that considers hot entry data may or may not employ other techniques described herein, such as automatic flush, smart flush, and address range flush.

Example Flush Process

Figure 5A:
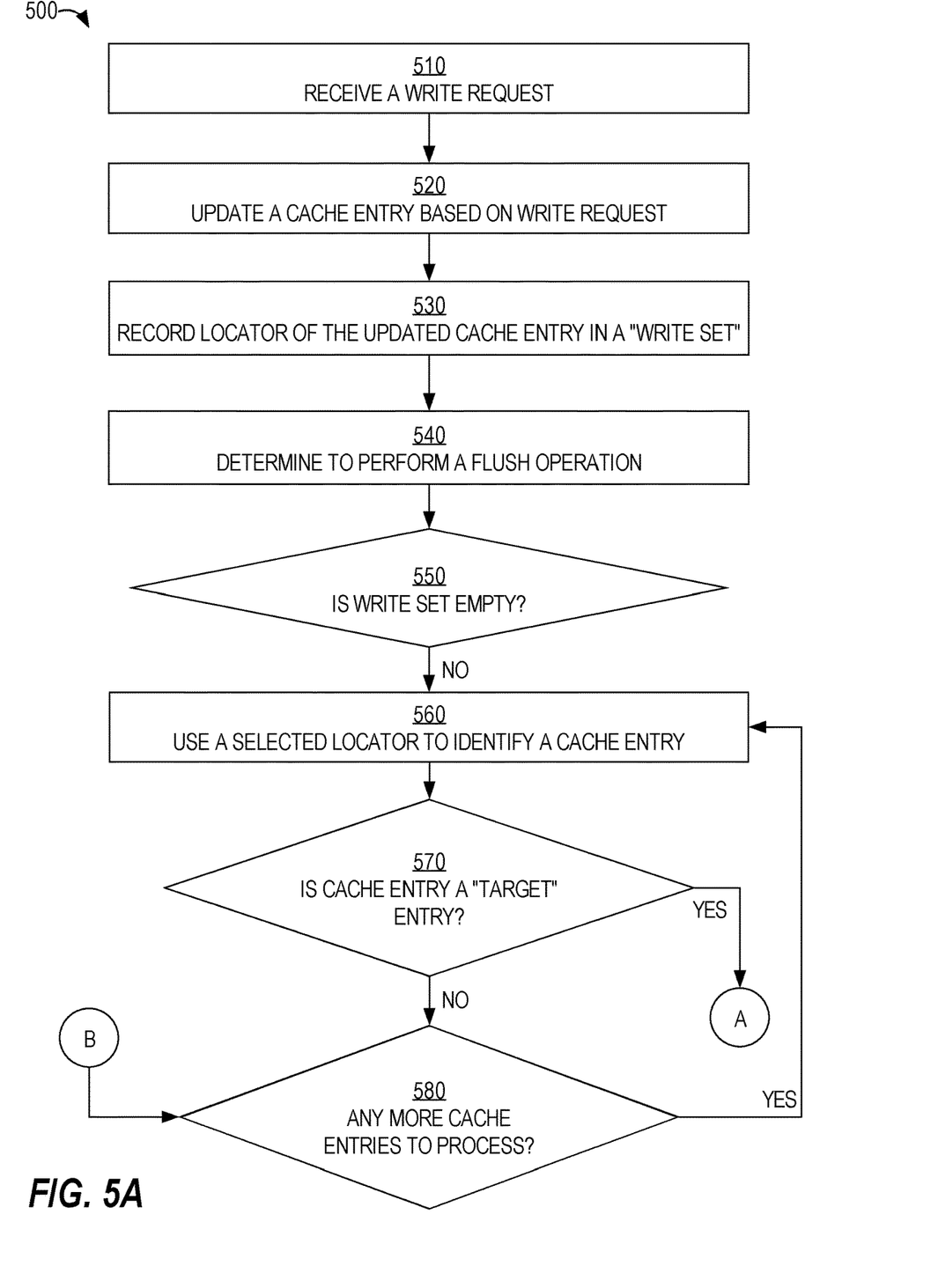
FIGS. 5A-5B is a flow diagram that depicts a process for performing a flush operation, in an embodiment.
Figure 5B:
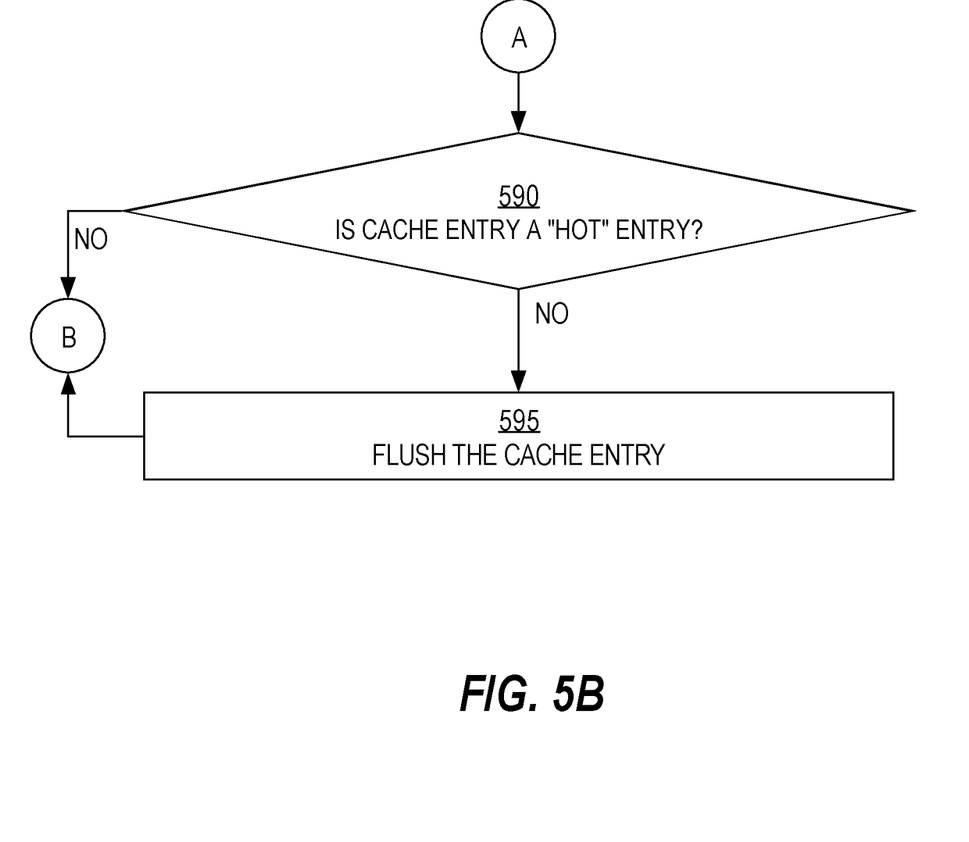

FIGS. 5A-5B is a flow diagram that depicts a process 500 for performing a flush operation, in an embodiment. Process 500 combines numerous techniques, such as smart flush, address range flush, and "hot" cache entries. However, other embodiments exclude one or more of such techniques.

At block 510, a write request is received. The write request includes one or more changes to a data item that is stored in cache 400. The write request may be received by flush module 450 or by cache 400 which includes logic that is not depicted in FIG. 4.

At block 520, a cache entry (in cache 400) that stores the data item is updated based on the one or more changes.

At block 530, an entry locator that identifies the cache entry is stored in write set 452. Block 520 may be performed by flush module 450. Blocks 510-530 may be performed a number of times before process 500 proceeds to block 540.

At block 540, a flush operation is determined to be performed. Flush module 450 may determine to perform the flush operation based on, for example, a time flush trigger, a size flush trigger, or a software flush trigger.

At block 550, it is determined whether write set 452 is empty or, rather, whether there is any entry locator indicated in write set 452. If write set 452 is empty, then process 500 proceeds to block 510 if another write request is received or to block 540 if another flush operation is determined to be performed. Otherwise, process 500 proceeds to block 560.

At block 560, an entry locator indicated in write set 452 is selected and used to identify a particular cache entry in entries 410. Block 560 may be performed by walker logic 456.

At block 570, it is determined whether the particular cache entry is a target cache entry, i.e., one that is associated with address range data that indicates that the data item stored in the particular cache entry is associated with an address that is in a particular set of particular addresses. If not, then process 500 proceeds to 580. Otherwise, process 500 proceeds to block 590.

At block 580, it is determined whether write set 452 contains an entry locator that has not yet been processed. If not, then process 500 proceeds to block 510 if another write request is received or to block 540 if another flush operation is determined to be performed. Otherwise, process 500 proceeds to block 560 where an "unprocessed" entry locator is selected.

At block 590, it is determined whether the particular cache entry is "hot." If so, then hot entry data (e.g., bit C) is reset to indicate that the particular cache entry is not "hot" and process 500 proceeds to block 580. Otherwise, process 500 proceeds to block 595.

At block 595, the particular cache entry is flushed. Process 500 proceeds to block 580.

Although FIG. 5 and the corresponding description indicate a particular order in which process 500 is implemented, other embodiments do not require this order or even all the blocks to be performed. For example, the "hot" check in block 590 may be performed before the "target" check in block 570. As another example, the target and hot checks in blocks 570 and 590 may not be performed at all.

What is claimed is:

1. A cache unit comprising:
   a plurality of entries, each of which is configured to store a data item;
   first storage for storing a write set that includes one or more entry locators, wherein each of the one or more entry locators indicates an entry, of the plurality of entries, that stores a data item that includes one or more changes that have not yet been stored in a memory that is separate from the cache unit;
   second storage for storing overflow data that indicates whether an attempt to add an entry locator to the write set failed;
   logic that is configured to:
   determine to perform a flush operation;
   in response to determining to perform the flush operation, read the overflow data to determine whether to examine a dirty bit associated with each entry in the plurality of entries.

2. The cache unit of claim 1, wherein the logic is further configured to:
   in response to determining that the overflow data indicates that the attempt failed, examine the dirty bit associated with each entry in the plurality of entries;
   based on examining the dirty bit, cause multiple dirty entries of the plurality of entries in the cache unit to be flushed.

3. The cache unit of claim 2, wherein the logic configured to cause the multiple dirty entries to be flushed comprises logic configured to cause, for each entry in the multiple dirty entries, a data item that is stored in said each entry to be stored in the memory that is separate from the cache unit.

4. The cache unit of claim 1, wherein the logic is further configured to:
   in response to determining that the overflow data indicates that no attempt failed to add an entry locator to the write set, analyze the write set to determine which of the plurality of entries to flush.

5. The cache unit of claim 4, wherein:
   the plurality of entries includes one or more dirty entries and one or more non-dirty entries;
   none of the dirty bits associated with any of the non-dirty entries is examined during the flush operation.

6. The cache unit of claim 4, wherein the logic is further configured to:
   determine that the write set is empty;
   in response to determining that the write set is empty, cease the flush operation.

7. The cache unit of claim 1, wherein the logic is further configured to:

receive a plurality of updates;
for each update of the plurality of updates:
  update a particular data item in a particular entry of the plurality of entries;
  update the write set to include a particular entry locator that indicates the particular entry that stores the particular data item that was updated.

8. The cache unit of claim 1, wherein:
the logic is configured to receive, at the cache unit, a flush instruction that is included assembly code;
determining to perform the flush operation is in response to receiving the flush instruction;
the flush instruction does not include a memory address of any of the one or more data items in the cache unit.

9. The cache unit of claim 1, wherein determining to perform the flush operation comprises determining that a time interval has elapsed.

10. The cache unit of claim 1, wherein the write set does not include an entry locator of one of the plurality of entries that does not store a data item that includes a change that has not yet been stored in the memory.

11. A method comprising:
storing, in a cache unit, a plurality of entries, each of which is configured to store a data item;
storing, in the cache unit, a write set that includes one or more entry locators, wherein each of the one or more entry locators indicates an entry, of the plurality of entries, that stores a data item that includes one or more changes that have not yet been stored in a memory that is separate from the cache unit;
storing, in the cache unit, overflow data that indicates whether an attempt to add an entry locator to the write set failed;
determining to perform a flush operation;
in response to determining to perform the flush operation, reading the overflow data to determining whether to examine a dirty bit associated with each entry in the plurality of entries.

12. The method of claim 11, further comprising:
in response to determining that the overflow data indicates that the attempt failed, examining the dirty bit associated with each entry in the plurality of entries;
based on examining the dirty bit, causing multiple dirty entries of the plurality of entries in the cache unit to be flushed.

13. The method of claim 12, wherein:
the write set includes a plurality of entry locators;
examining the dirty bit associated with each entry in the plurality of entries is performed instead of analyzing the plurality of entry locators to determine which cache entries to flush.

14. The method of claim 11, further comprising:
in response to determining that the overflow data indicates that no attempt failed to add an entry locator to the write set, analyzing the write set to determine which of the plurality of entries to flush.

15. The method of claim 14, wherein:
the plurality of entries includes one or more dirty entries and one or more non-dirty entries;
none of the dirty bits associated with any of the non-dirty entries is examined during the flush operation.

16. The method of claim 14, further comprising:
determining that the write set is empty;
in response to determining that the write set is empty, ceasing the flush operation.

17. The method of claim 11, further comprising:
receiving a plurality of updates;
for each update of the plurality of updates:
  updating a particular data item in a particular entry of the plurality of entries;
  updating the write set to include an entry locator that indicates the particular entry that stores the particular data item that was updated.

18. The method of claim 11, further comprising receiving, at the cache unit, a flush instruction that is included in assembly code;
wherein determining to perform the flush operation is in response to receiving the flush instruction;
wherein the flush instruction does not include a memory address of any of the one or more data items in the cache unit.

19. The method of claim 11, wherein determining to perform the flush operation comprises determining that a time interval has elapsed.

20. The method of claim 11, wherein the write set does not include an entry locator of one of the plurality of entries that does not store a data item that includes a change that has not yet been stored in the memory.

* * * * *

UNITED STATES PATENT AND TRADEMARK OFFICE
CERTIFICATE OF CORRECTION

PATENT NO. : 11,210,224 B2
APPLICATION NO. : 16/714111
DATED : December 28, 2021
INVENTOR(S) : Hong et al.

It is certified that error appears in the above-identified patent and that said Letters Patent is hereby corrected as shown below:

On the Title Page

On page 2, Column 1, under Other Publications, Line 3, delete "lanuage" and insert -- language --, therefor.

On page 2, Column 2, under Other Publications, Line 1, delete "Experiemnt" and insert -- Experiment --, therefor.

On page 2, Column 2, under Other Publications, Line 4, delete "Fith" and insert -- Fifth --, therefor.

In the Specification

In Column 4, Line 27, delete "date" and insert -- data --, therefor.

In Column 4, Line 46, delete "'1)" and insert -- 1) --, therefor.

In the Claims

In Column 15, Line 10, in Claim 8, delete "included" and insert -- included in --, therefor.

Signed and Sealed this
Seventh Day of June, 2022

Katherine Kelly Vidal
*Director of the United States Patent and Trademark Office*